United States Patent
Popovic et al.

(10) Patent No.: US 7,408,891 B2
(45) Date of Patent: Aug. 5, 2008

(54) ECHO CANCELLER EMPLOYING H-REGISTER AND STORAGE REGISTER

(75) Inventors: Mirjana Popovic, Ontario (CA); Dieter Schulz, Ontario (CA); Jan Radecki, Ontario (CA)

(73) Assignee: Mitef Networks Corporation, Ottawa, Ontario (CA)

( * ) Notice: Subject to any disclaimer, the term of this patent is extended or adjusted under 35 U.S.C. 154(b) by 768 days.

(21) Appl. No.: 10/446,359

(22) Filed: May 28, 2003

(65) Prior Publication Data

US 2003/0223382 A1 Dec. 4, 2003

(30) Foreign Application Priority Data

May 28, 2002 (GB) .................................. 0212298.4

(51) Int. Cl.
*H04B 3/20* (2006.01)
*H04M 9/08* (2006.01)

(52) U.S. Cl. .................. 370/290; 370/286; 379/406.01; 379/406.08

(58) Field of Classification Search ................ 375/219, 375/324, 326, 345, 346, 355, 232, 246, 350; 370/286, 287, 289, 290, 291; 379/386, 406.01, 379/406.08, 406.05; 708/322, 323
See application file for complete search history.

(56) References Cited

U.S. PATENT DOCUMENTS

| | | | |
|---|---|---|---|
| 5,631,900 A | 5/1997 | McCaslin et al. | |
| 5,663,955 A | 9/1997 | Ivengar | |
| 5,664,011 A | 9/1997 | Crochiere et al. | |
| 5,867,486 A * | 2/1999 | Sugiyama | 370/290 |
| 6,028,929 A | 2/2000 | Laberteaux | |
| 6,031,908 A | 2/2000 | Laberteaux et al. | |
| 6,088,445 A * | 7/2000 | Chadha et al. | 379/406.08 |
| 6,163,609 A * | 12/2000 | Makinen et al. | 379/406.08 |
| 6,181,793 B1 | 1/2001 | Laberteaux et al. | |
| 6,219,418 B1 | 4/2001 | Eriksson et al. | |
| 6,324,170 B1 * | 11/2001 | McClennon et al. | 370/286 |
| 6,434,110 B1 | 8/2002 | Hemkumar | |
| 6,445,792 B1 * | 9/2002 | Shiraki et al. | 370/286 |
| 6,563,803 B1 * | 5/2003 | Lee | 370/290 |
| 6,580,696 B1 * | 6/2003 | Chen et al. | 370/286 |
| 6,718,035 B2 * | 4/2004 | Younce et al. | 379/406.01 |
| 6,768,723 B1 * | 7/2004 | Popovic et al. | 370/287 |
| 6,959,167 B1 * | 10/2005 | Dehandschutter | 455/1 |

FOREIGN PATENT DOCUMENTS

| | | |
|---|---|---|
| EP | 0 700 171 | 3/1996 |
| EP | 1 093 284 A2 | 4/2001 |
| GB | 2 344 500 | 6/2000 |
| WO | WO99/26399 | 5/1999 |

* cited by examiner

*Primary Examiner*—Young T. Tse

(57) ABSTRACT

An echo canceller comprising a digital filter having adaptive coefficients which are updated to simulate an echo response, a temporary register for storing default coefficients, and a controller for monitoring ERLE and in the event the ERLE is greater than a first predetermined threshold then enabling the digital filter and replacing the default coefficients in the temporary register with the adaptive coefficients, and in the event the ERLE is less than a second predetermined threshold then disabling the digital filter and replacing the adaptive coefficients with said the default coefficients from the temporary register.

2 Claims, 1 Drawing Sheet

ECHO CANCELLER EMPLOYING H-REGISTER AND STORAGE REGISTER

FIELD OF THE INVENTION

This invention relates generally to echo cancellers, and more particularly to an H-register echo canceller incorporating a register for storing default coefficients for use in the event that the echo canceller diverges.

BACKGROUND OF THE INVENTION

Echo cancellers (ECs) are well known in the art for providing cancellation of echoes resulting from imperfect impedance matching by hybrids in two-to-four wire signal conversion or in the case of Acoustic Echo Cancellers, providing cancellation of echoes resulting from acoustic coupling from the handsfree speaker to the handsfree microphone. Prior art adaptive line echo cancellers (LECs) and acoustic echo cancellers (AEC) employing the Least Mean Square (LMS) algorithm are useful in quickly adapting to changes in the echo path response. However, such echo cancellers suffer from poor performance in the presence of "double talk" (a condition that occurs when the near end and far end speakers are talking at the same time). Several approaches have attempted to overcome the problem of poor echo cancellation in the presence of "double talk" by incorporating a dual-H architecture wherein a first filter having non-adaptive coefficients simulates the echo response in conjunction with a second adaptive filter. Both filters provide filtering and the residual echo generated by both filters is compared. If the residual echo from the second filter is smaller than the residual echo from the first filter then the adaptive filter coefficients are transferred into the first filter. Examples of such prior art systems are described in the following patents:

U.S. Pat. No. 6,219,418: Adaptive dual filter echo cancellation method; Eriksson; Anders, Karlsen; Johnny; Telefonaktiebolaget LM Erricsson, Stockholm, Sweden; Apr. 17, 2001;

U.S. Pat. No. 6,181,793: Echo canceller employing dual-H architecture having improved coefficient transfer; Laberteaux; Kenneth P., Younce; Richard C., Tellabs Operations, Inc., Lisle, Ill.; Jan. 30, 2001;

U.S. Pat. No. 6,031,908: Echo canceller employing dual-H architecture having variable adaptive gain settings; Laberteaux; Kenneth P., Younce; Richard C., Dunne; Bruce E., Farrell; David S.; Tellabs Operations, Inc., Lisle, Ill., Feb. 29, 2000;

U.S. Pat. No. 6,028,929: Echo canceller employing dual-H architecture having improved non-linear echo path detection; Laberteaux; Kenneth; Tellabs Operations, Inc., Lisle, Ill.; Feb. 22, 2000;

U.S. Pat. No. 5,663,955: Echo canceller system with shared coefficient memory; Iyengar; Vasu; Lucent technology Inc, Allentown, Pa., Sep. 2, 1997; and U.S. Pat. No. 5,664,011; Echo canceller with adaptive and non-adaptive filters; Crochiere; Ronald Eldon, Iyenegar; Vasu; Lucent Technology Inc. Murray Hill, N.J.; Sep. 2, 1997.

SUMMARY OF THE INVENTION

According to the present invention, the echo canceller EC coefficients are captured and stored once the EC is converged, for use as default coefficients in the event that the EC diverges in the presence of double talk or while tracking the statistical variations of the signal. A novel method is set forth for controlling the criteria for capturing these coefficients for use by the active EC, thereby resulting in highly stable EC operation under many different signal conditions.

More particularly, according to the present invention, an adaptive filter is used in conjunction with a temporary register in which coefficients and an echo return loss enhancement (ERLE) are stored. A controller monitors ERLE and selectively enables and disables the adaptation process and transfers the default coefficients into the filter. In contrast with the prior art, a single adaptive filter carries out the filtering process, thereby reducing the calculation complexity over the prior art. However, the resulting performance is similar to that of prior art dual-H register systems.

BRIEF DESCRIPTION OF THE DRAWINGS

A detailed description of the invention is set forth herein below, with reference to the accompanying block diagram of an echo canceller according to the preferred embodiment.

DETAILED DESCRIPTION OF THE PREFERRED EMBODIMENT

Figure 1:
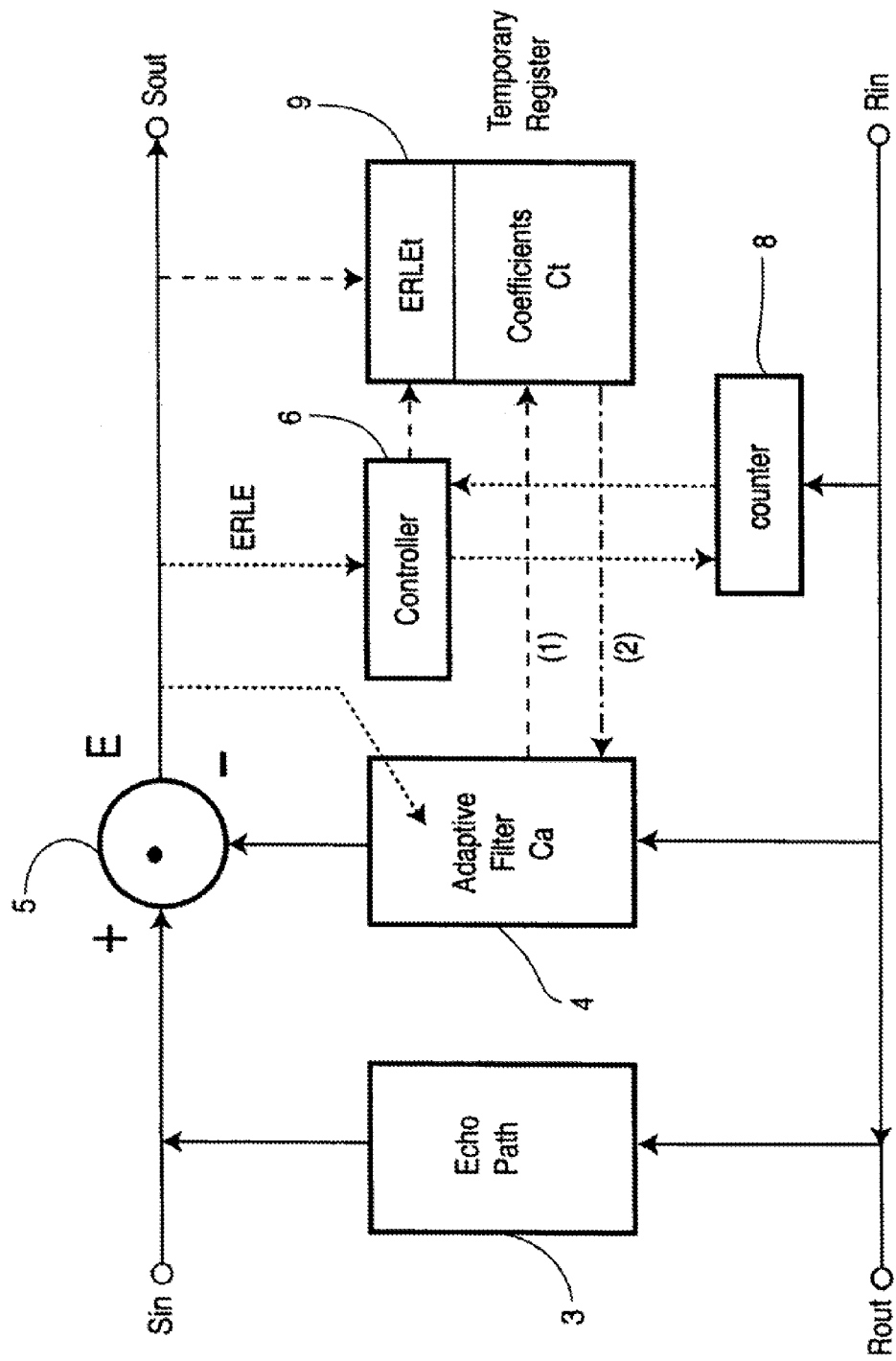

In the system of FIG. 1, an incoming signal $R_{in}$ from a remote telephone system is received and applied to a near end telephone ear piece of speakerphone via $R_{out}$. A near end signal $S_{in}$ is received for transmission to a far end telephone system as signal $S_{out}$. However, as a result of impedance mismatches, a portion of the signal $R_{out}$ is echoed back to the far end through an echo path 3 and added to the near end signal $S_{in}$. An adaptive filter 4 simulates the echo path impulse response using coefficients Ca and creates an echo replica by minimization of the echo energy E. The echo is canceled during the call within subtractor 5.

A temporary register 9 is provided for storing default coefficients Ct and temporary values of ERLEt. Controller 6 enables transfer of coefficients Ca and Ct between the filter 4 and the register 9.

In operation, at the start of a call the ERLE=0 is written into the temporary register 9 as ERLE max. Once the convergence reaches an initial state (e.g. ERLE>16 dB), if the short term average of ERLE is greater than ERLE max then the coefficients of the adaptive filter Ca are transferred to the temporary register 9 and stored as Ct, and the ERLE is stored as ERLE max. In the event ERLE<ERLE max*ERLE_threshold1 (e.g. ERLE is less than ERLE max by 20 dB where ERLE_threshold1=0.1), the adaptive filter coefficients Ca are replaced by coefficients Ct from the temporary register 9. The Ct coefficients remain as Ca until and unless ERLE>ERLE max*ERLE_threshold2 (e.g. ERLE_threshold2=0.5), in which case ERLE max=ERLE, and the process of copying the adaptive coefficients Ca and the ERLE to the temporary register 9 continues, provided that ERLE>ERLE max.

When the coefficients Ca are replaced by Ct then a timing-counter 8 starts counting speech samples while the short term energy average of the Rin signal exceeds a predetermined Rin_threshold (i.e. while the Rin signal is above the noise floor). If the equation ERLE>ERLE max*ERLE_threshold2 is satisfied the timing-counter is set to zero. In the event that the timing counter exceeds a predetermined value of time_max (e.g. 3 seconds) then the low ERLE has been caused by a change of the echo path impulse response. Therefore, the adaptive coefficients Ca, temporary register coefficients Ct and ERLE max are set to zero. The adaptation process then re-starts from these initial conditions.

The echo canceller is disabled for in-band signals and the adaptive filter 4 is deactivated.

The following pseudo-code exemplifies the echo cancellation algorithm according to the present invention:

```
Adapt = 0 adaptation disabled;
Adapt = 1 adaptation enabled;
ERLE_init - early convergence state
Initialization
ERLEmax = 0;
Ct = Ca = 0;
Cntr = 0;
Adapt = 1;
Flag = 0;
If (in-band tone)
{
    Adapt = 0;
}
Start:
If (Adapt == 1)
{
    do Adaptation on Ca;
}
if (ERLE > ERLE_init)
{
    if (ERLE >= ERLEmax)
    {
        ERLEmax = ERLE;
        Ct = Ca;
    }
    if(ERLE < ERLEmax* ERLE_threshold1)
    {
        Ca = Ct;
        Set flag = 1;
        If(Rin > Rin_threshold)
        {
            Cntr++;
        }
    }
    if(flag = 1 && ERLE > ERLEmax* ERLE_threshold2)
    {
        ERLEmax = ERLE;
        Ct = Ca;
        Flag = 0;
    }
    if((cntr == cntr_threshold)
    {
        Ct = Ca = 0.0;
        ERLE = ERLEmax = 0.0;
        Adapt = 1;
    }
}
```

A person of skill in the art will appreciate that the principles of the invention may be used in many applications involving adaptive processes, such as acoustic echo cancellers used for full duplex handsfree speakerphones.

Modifications and alternative embodiments of the invention are possible without departing from the sphere and scope of the invention as set forth in the claims appended hereto.

What is claimed is:

1. An echo canceller comprising:
   a digital filter having adaptive coefficients which are updated to simulate an echo response;
   a temporary register for storing default coefficients;
   a controller for monitoring Echo Return Loss Enhancement (ERLE) and in the event that the ERLE is less than a first predetermined threshold, the controller replaces said adaptive coefficients in said digital filter with said default coefficients from said temporary register, said adaptive coefficients remaining as said default coefficients from said temporary register until the ERLE is greater than a second predetermined threshold, subsequent to which said default coefficients in said temporary register are updated by said controller with said adaptive coefficients; and
   a counter in communication with said controller, said counter counting speech samples of an incoming signal while the short term energy average of said incoming signal exceeds a further predetermined threshold and, in the event that said counter counts in excess of a predetermined counter threshold, said controller then initializes said adaptive coefficients, said default coefficients and the ERLE which are set to zero.

2. For use in an echo canceller having a digital filter with adaptive coefficients which are updated to simulate an echo response, and a temporary register for storing default coefficients and temporary values of echo return loss enhancement (ERLE), a method of selecting said adaptive and default coefficients comprising:
   monitoring an ERLE output from said echo canceller;
   in the event that the ERLE is greater than an initial threshold then storing the ERLE as ERLE max and replacing said default coefficients in said temporary register with said adaptive coefficients while the ERLE remains greater than the ERLE max;
   in the event that the ERLE is less than a first predetermined threshold then replacing said adaptive coefficients in said digital filter with said default coefficients from said temporary register, said adaptive coefficients remaining as said default coefficients until the ERLE is greater than a second predetermined threshold, then storing the ERIE as ERLE max and replacing said default coefficients in said temporary register with said adaptive coefficients;
   continuing to store the ERLE as ERLE max and replacing said default coefficients in said temporary register with said adaptive coefficients as long as the ERIE remains greater than the ERIE max; and
   counting speech samples of an incoming signal while the short term energy average of said incoming signal exceeds a further predetermined threshold and, in the event that the counting exceeds a predetermined counter threshold then initializing said adaptive coefficients, said default coefficients and the ERLE max which are set to zero.

* * * * *

UNITED STATES PATENT AND TRADEMARK OFFICE
CERTIFICATE OF CORRECTION

PATENT NO. : 7,408,891 B2
APPLICATION NO. : 10/446359
DATED : August 5, 2008
INVENTOR(S) : Mirjana Popovic, Dieter Schulz and Jan Radecki It is certified that error appears in the above-identified patent and that said Letters Patent is hereby corrected as shown below:

On title page item [73]
THE CORRECT SPELLING OF ASSIGNEE'S NAME SHOULD READ AS FOLLOWS:

--MITEL NETWORKS CORPORATION--.

Signed and Sealed this

Seventh Day of October, 2008

JON W. DUDAS
*Director of the United States Patent and Trademark Office*